Nov. 29, 1966 — W. R. HIRE — 3,287,895
FOLDABLE LITTER STRUCTURE
Filed Dec. 16, 1964 — 4 Sheets-Sheet 1

INVENTOR.
WILLIAM R. HIRE
BY
MAHONEY, MILLER & RAMBO
ATTORNEYS

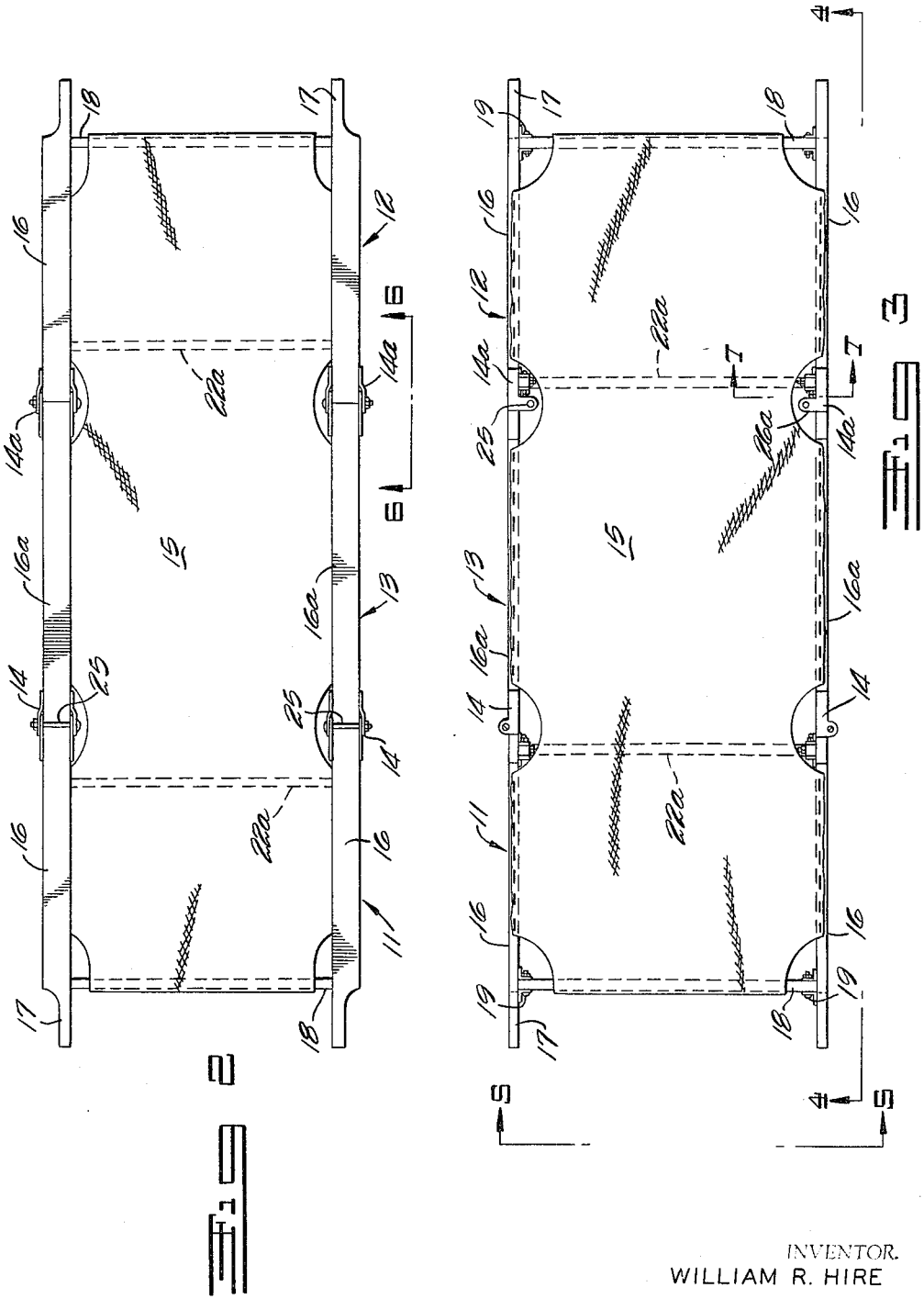

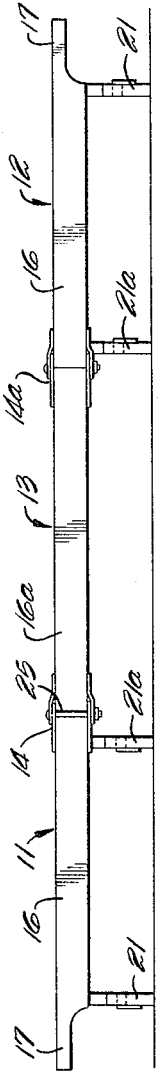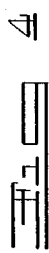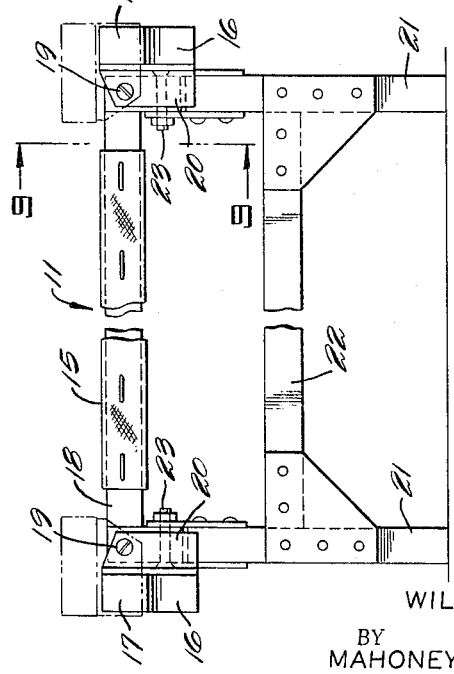

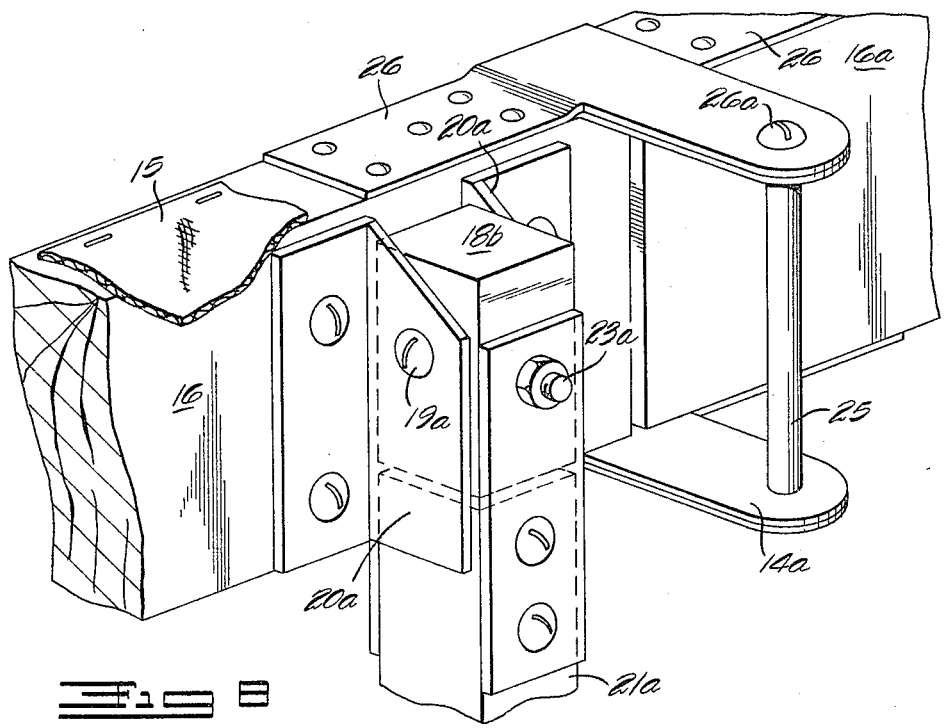
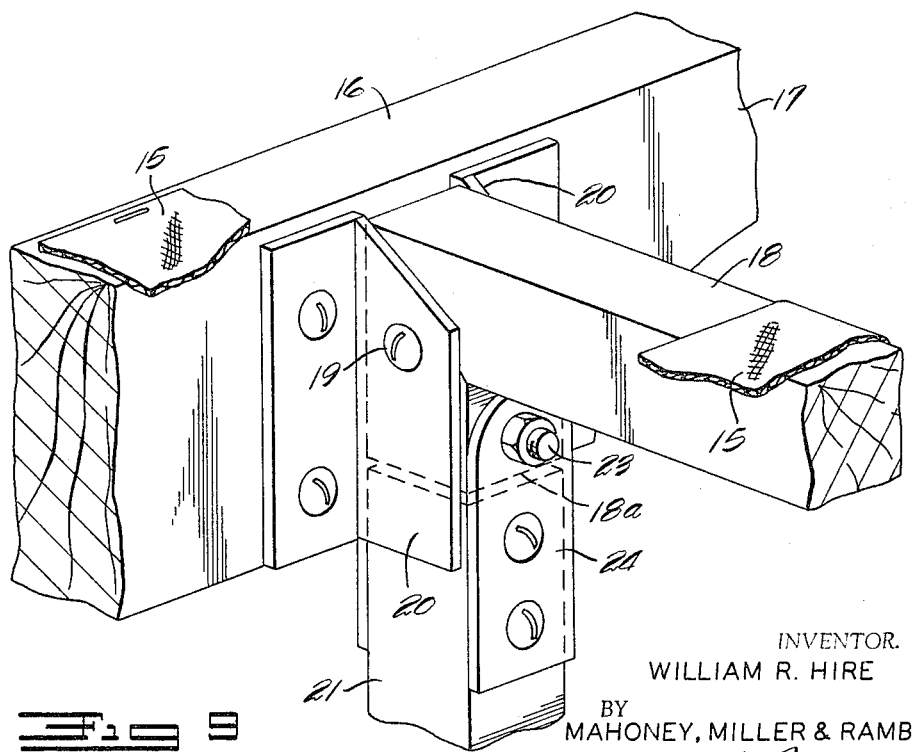

United States Patent Office 3,287,895
Patented Nov. 29, 1966

3,287,895
FOLDABLE LITTER STRUCTURE
William R. Hire, Newark, Ohio, assignor by direct and mesne assignments to Research Manufacturing, Inc., Newark, Ohio, a corporation of Ohio
Filed Dec. 16, 1964, Ser. No. 418,615
9 Claims. (Cl. 5—82)

This invention relates to a foldable litter structure. It has to do, more specifically, with a foldable portable litter, cot, or couch structure on which a sick or injured person may recline or be laid especially for conveyance or transportation.

According to this invention, a litter structure is provided which is composed of a plurality of hingedly connected, longitudinally adjacent sections, so arranged as to be folded or collapsed, accordion-like, into a compact unit when not in use so that it can be stored in the limited space usually provided in ambulances or similar emergency vehicles. When the litter is to be used to receive a patient, the folded or collapsed sections can be extended into straight longitudinally-adjoining order to provide an extended surface upon which the patient may be disposed in a reclining or recumbent position. The structure is very light in weight so that it can be folded and unfolded with ease and so that it will not add unduly to the load of the litter bearers. The litter of this invention is structurally simple yet mechanically efficient and is so designed that it may be folded or collapsed easily into a compact arrangement when not in use or may be extended and rigidly locked in extended condition to provide an elongated patient-receiving and supporting surface upon which the patient may rest or recline comfortably. When extended into supporting position for the patient, the litter is rigidly and safely locked in such condition with minimum effort and without the aid of detachable fastening devices, etc. and without the aid of tools for applying or assembling such devices. Furthermore, when locked in extended condition, there is no danger of accidental folding or collapse of the litter while the patient is supported thereby. The locking arrangement is such that it must be purposely positively released in order to again permit folding of the litter. Also, the litter structure is of such a nature that it is economical to produce and is sufficiently rugged to withstand normal usage and even considerable abuse.

According to this invention, the litter comprises a plurality of similar frame sections hingedly connected together in longitudinal succession. The frame sections include two end sections with one or more intermediate sections and are hinged to each other at alternating opposed faces so as to permit the sections to be folded one upon another successively in accordion style with the frame sections in substantially parallel, superimposed relationship to each other. Each of the hingedly-connected, frame sections comprises a pair of opposed side rails and each of the end sections includes a rigid cross tie member, preferably disposed at the extreme outer end thereof, to which the outer ends of a flexible patient-supporting web or other equivalent supporting means are anchored. This flexible web extends longitudinally throughout the length of all the hinged frame sections and is foldable therewith. It preferably is also connected to the side frame rails of the respective frame sections. This web will provide a flexible patient-supporting surface or bed, when the litter sections are extended, for receiving and supporting the patient. In addition to the web-anchoring cross tie members at the ends of the litter, various other rigid cross tie members may be provided where necessary or desirable between the opposed side rails of any of the frame sections. All of the rigid cross tie members provided are pivotally connected at their opposed ends, either directly or indirectly, to the adjacent opposed side rails in a manner to permit bodily pivoting or turning of the side rails, relative to the tie members, only about an axis extending longitudinally of the rails and at right angles to the longitudinal axes of the cross tie members. The hinge means for connecting adjacent side rails of the frame sections are so arranged that the lineal pintles or hinge axes thereof are disposed transversely of and normal to the longitudinal axes of the side rails and the hinge means is turnable bodily with said side rails. Therefore, bodily turning or pivoting of the hingedly-connected side rails, at the respective sides of the litter, permits positioning of the hinge means thereof at a first unlocked position, in which the hinge axes are disposed in parallel relationship to the longitudinal axes of said cross ties, to permit said sections to be folded with respect to one another, and a second position in which their hinge axes are disposed in perpendicular relation to the longitudinal axes of said cross ties to thereby lock said sections against relative folding movement.

In the accompanying drawings, there is illustrated a preferred form of litter in which the present invention is embodied but it is to be understood that specific details of this invention may be varied without departing from basic principles thereof.

In these drawings:

FIGURE 2 is a plan view showing the litter in extended but unlocked condition.

FIGURE 3 is a similar view but showing the litter in extended and locked condition.

FIGURE 4 is a side elevational view taken from the position indicated at line 4—4 of FIGURE 3.

FIGURE 5 is an enlarged end elevational view taken from the position indicated at line 5—5 of FIGURE 3.

FIGURE 6 is an enlarged, fragmentary side elevation taken from the position indicated at line 6—6 of FIGURE 2.

FIGURE 8 is an enlarged, fragmentary perspective view of the intermediate leg pivot structure taken from the position indicated at line 8—8 of FIGURE 7.

FIGURE 9 is a similar view of the end leg and cross tie pivot structure taken from the position indicated at line 9—9 of FIGURE 5.

Figure 1:
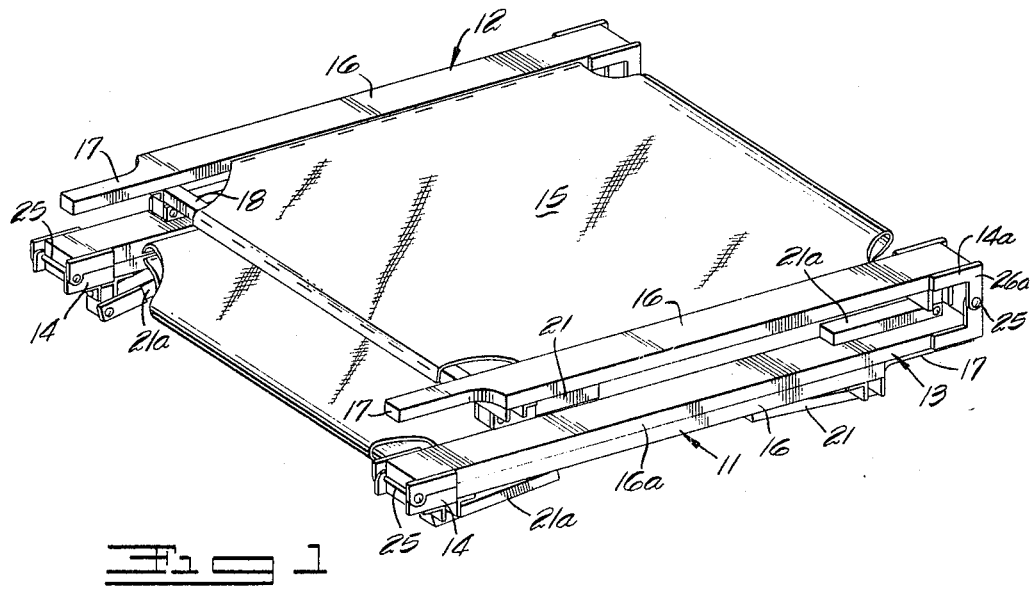
FIGURE 1 is a perspective view of the litter in folded condition.

With reference to the drawings, the litter structure embodying this invention is shown as comprising a plurality of sections including identical end sections 11 and 12 and a similar intermediate section 13. However, it is to be understood that any desired number of intermediate sections may be provided. The adjoining sections of the litter are connected together in longitudinal succession by sets of hinges, between adjacent sections, with the successive sets of longitudinally spaced hinges being preferably located at opposite faces, or top and bottom, of the litter, so that the sections can be folded together in accordion style, as shown in FIGURE 1, wherein the sections are in flat superimposed, substantially parallel relationship. These sets of hinges are indicated at 14 and 14a, the sets 14 being between the end section 11 and the intermediate section 13 and the sets 14a being between the end section 12 and the intermediate section, the two sets differing slightly. When the litter is unfolded or extended, the sections will be in longitudinally-adjoining relationship with the sections extended in a common horizontal plane, as shown in FIGURES 2–4, inclusive. Each end section comprises a frame section composed of a pair of elongated side rails and one or more rigid cross tie members pivotally connected thereto, the frame sections supporting a flexible web, or other patient-supporting means, which extends the full length of the litter in association with all the successivve frame sections. This flexible patient-supporting web or other supporting surface is indicated generally by the numeral 15.

As indicated above, the end sections 11 and 12 are substantially identical. Each section includes a frame comprising a pair of opposed, longitudinally-extending side rails 16, which may be of various cross section but are shown as having a rectangular cross-section. The opposed side rails of each end section extend outwardly to provide hand grip portions 17 at their outer ends. The side rails of each end frame section are joined together in laterally-spaced relationship by means of rigid cross tie members 18 which also serve as means for anchoring the ends of the flexible web 15 to the litter end sections 11 and 12. The rails and the cross tie members and similar parts of the litter may be of wood, aluminum, or other lightweight but strong material. The members 18 may be rails or bars of suitable cross-section but are shown of square cross-sectional form. Each end of each cross tie 18 is pivotally connected to one face of the associated side rail 16 at one edge thereof.

As previously indicated, the patient-supporting surface is preferably the flexible web 15 formed as a continuous supporting surface but it could be a webbing formed of interlaced strips or other interwoven or criss-crossed strands. Its ends are preferably extended around and suitably anchored to the end tie members 18, which as indicated, will be spaced inwardly from the outer extremities of the hand grip portions 17. Preferably, the side edges of the web 15 are secured to the adjacent side rails 16 of the end sections 11 and 12.

The intermediate section 13 is shown as having a frame formed only of the side rails 16a which are hinged between the respective pair of side rails 16 of the end sections 11 and 12 at each side of the litter. However, these rails 16a could, if desired, be joined by cross tie members pivotally connected thereto as described in connection with the cross tie members 18 and associated side rails 16. The web 15 may have its side edges also secured to the adjacent side rails 16a.

The pivot structures for connecting the cross tie members 18 to the associated side rails 16 is shown best in FIGURES 5 and 9. It will be noted best from FIGURE 9 that the end of the member 18 is provided with an extension or lug 18a, which may be integral therewith and is of the same square cross-section, that is disposed at a right angle to the longitudinal axis of the member 18. The end of the member 18 is pivoted by means of a pivot pin 19 between two lugs 20 provided by angle brackets that are fastened to the inner face of the side rail 16. These lugs project inwardly at right angles to the flat inner face of the rail 16 and provide a channel, extending transversely of the rail substantially its full width, for receiving the right-angular end of the tie member 18. Thus, each side rail 16 is pivoted to the associated end of the tie member 18 to permit swinging movement of the rail about the axis of the pivot 19 which is at a right angle to the longitudinal axis of the member 18 and extends longitudinally of the litter parallel to the longitudinal axis of the side rail 16.

In most instances, it is desirable to have folding legs on the litter so that the litter can be set down without the web 15 contacting the surface on which the litter is supported, assuming a patient is in position thereon. However, it is not necessary in all instances to provide these legs. If the legs are used, the ends of the tie members 18 will have legs 21 associated therewith as shown in FIGURES 5 and 9. Thus, a pair of legs 21 will be associated with each cross tie 18 and the legs of each pair will be rigidly joined together by means of a rigid cross brace or tie member 22 which will be disposed with its longitudinal axis transversely of the rails 16 and parallel to but outwardly of that of the tie member 18. The legs 21 are similar in cross-section, in shape and size, to the lug extensions 18a on the members 18.

Each leg 21 has its inner end pivoted to the adjacent and aligning lug 18a by a pivot pin 23 disposed at a right angle to the pivot 19. The pin 23 passes through the lug 18a and through the opposed lugs 24 which straddle the upper end of the leg 21 and project upwardly therefrom and extends transversely of the litter parallel to the longitudinal axis of the tie member 18. These lugs 24 are suitably secured to the opposed faces of the leg 21. When the leg 21 is aligned with the lug extension 18a of the cross member 18, its flat inner end is closely adjacent the flat end of the lug 18a. When in these relative positions (FIGURE 9) the channel-forming lugs 20 overlap the joint between these members and prevent the leg 21 from swinging about the pivot 23 relative to the lug 18a. However, if the side rail 16 is swung outwardly about the pivot 19, it will unlock the leg, since the lugs 20 will swing outwardly away from the leg, and thereafter the leg 21 can pivot forwardly and rearwardly about the pin 23.

Figure 7:
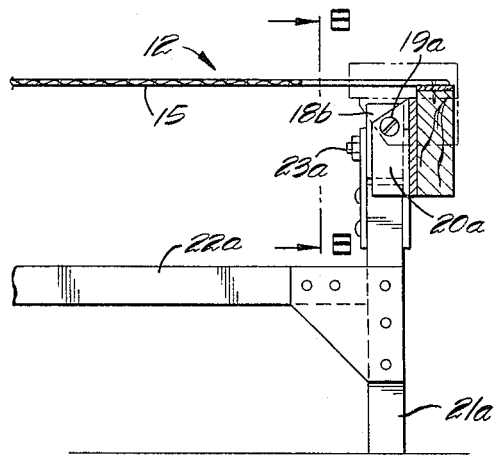
FIGURE 7 is an enlarged, transverse, vertical sectional view taken along line 7—7 of FIGURE 3.

Thus, leg units are provided at the ends of the litter and are foldable inwardly if the associated rails 16 are in flat horizontal position rather than upright as shown in FIGURE 9. Additional foldable leg units are preferably provided intermediate the length of the litter, and in the example shown are provided at the inner end of each end sections 11 and 12 in association with the side rails 16 thereof. The pivotal mounting for each of these units is illustrated best in FIGURES 7 and 8.

Each intermediate leg unit comprises a pair of legs 21a which are braced by a transverse brace structure 22a like the brace 22 of FIGURE 5. Each leg 21a is pivoted at its inner end to a lug 18b for pivotal movement about a pivot pin 23a which extends transversely of the litter and parallel to the longitudinal axis of the brace or cross tie member 22a. The lug 18b and the leg 21a are of similar cross-section and their flat ends are locked closely adjacent, by the channel-forming lugs 20a which overlap the joint therebetween when the side rail 16 is in the upright condition shown in FIGURE 8. The lug 18b is disposed between the lugs 20a and is pivoted thereto by the pivot pin 19a which is offset at a right angle to the pivot pin 23a and extends longitudinally of the litter or parallel to the axis of the rail 16, that is, at a right angle to the longitudinal axis of the cross brace or tie 22a.

In this example of litter embodying this invention, the foldable legs are only on the end units but they could as well be in the intermediate rails 16a. The pins 19 and 19a at each side of the litter are in axial alignment along an axis extending longitudinally of the complete side rail of the litter formed by the hinged sections 16 and 16a. This axis is offset toward one edge and inwardly of the longitudinal axis of the complete side rail. Therefore, the complete side rail at each side of the litter may be turned about the pivot axis (corresponding to the axes of the aligned pivot pins 19 and 19a) to move the side rail from horizontal flat leg-unlocking position shown in FIGURE 2 to the vertical upright edge position shown in FIGURES 3 and 4 where the legs are locked in position. In the unlocking position, the channels on the side rails formed by the lugs 20 and 20a, do not receive the inner ends of the legs 21 and 21a so they are free to fold about the pivots 23 and 23a, but in the locking position, the channels do receive the inner ends of the legs and prevent swinging about the pivots.

The hinges 14 and 14a between the side rails 16 and 16a each includes a hinge pin or pintle 25 which provides a lineal hinge axis that extends transversely of the side rail at a right angle or perpendicular to the longitudinal axis of the side rail. Each hinge embodies straps 26 connected to the respective adjacent side rails 16 and 16a, but in the hinge 14a these straps are provided with inward extensions 26a to offset the pin 25 from the inner faces of the side rails. It will be noted that the hinges 14a and the hinges 14 are at opposite faces of the side rails.

When the side rails are in leg-unlocking condition, that is horizontally flat as shown in FIGURE 2, this permits folding of the litter sections 11, 12 and 13 as well as the legs carried thereby. This is due to the fact that, at this time, the hinge axes of the pintles 25 are disposed in parallel relation to the longitudinal axes of the different cross tie members 18, 22 and 22a. At this time, the sections 11, 12 and 13 may be folded into overlapping relationship with the various leg units folded as indicated in FIGURE 1. The offsetting of the hinge pin 25 of the hinges 14a will permit the positioning of the folded leg units 21 and 21a between the overlapping sections 12 and 13. The flexible web 15 will readily fold at the hinge joints. Thus, the entire litter can be folded in a compact unit so it will occupy a minimum of space.

When desired, the litter may be unfolded and the side rail sections 16 and 16a can be aligned, as in FIGURE 2, with the various legs 21 and 21a unfolded and perpendicular thereto. Both complete side rails can now be turned or rotated downwardly, each being turned bodily about the longitudinal pivot axes which passes through the pivot pins 19 and 19a. This will position the side rails upright, as shown in FIGURES 3 and 4, and will move the hinge pintle axes from a position parallel to the longitudinal axes of the cross tie members to a new position where they are perpendicular to the longitudinal axes of said cross tie members. In this latter position, all the side rail sections 16 and 16a at each side will be locked in longitudinal alignment and all the legs 21 and 21a will be locked in depending perpendicular relationship to the side rails. Thereafter, the litter may be carried without danger of it folding. The only way it can fold is by positively turning the side rails back to their original positions.

It will be apparent that this invention provides a simple lightweight, inexpensive litter structure which can be folded into a compact unit or be extended into an elongated unit for receiving and supporting the patient. When extended, it is effectively locked in such condition without danger of folding under the weight of the patient. Also, when extended, the supporting legs are locked in supporting positions but when the litter is folded, they are folded in out-of-the-way positions.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A foldable litter comprising a plurality of relatively adjoining frame-forming sections foldably connected and carrying patient supporting means foldable with said sections; each of said sections including a pair of relatively spaced apart, longitudinally extending side rails, certain of said sections including at least one rigid cross tie extending transversely between said side rails; means pivotally connecting the side rails of said sections to the cross ties thereof and providing for turning movement only of said side rails with respect to said cross ties about axes extending longitudinally of said side rails; and hinge means connecting the side rails of each of said sections to the side rails of another of said sections, said hinge means including lineal hinge pin means whose axes are disposed in perpendicular relation to the longitudinal axes of said side rails and said hinge means being turnable bodily with said side rails about the longitudinal axes of said side rails between a first position in which the axes of their hinge pin means are disposed in parallel relation to the longitudinal axes of said cross ties to permit said sections to be folded with respect to one another and a second position in which the axes of their hinge pin means are disposed in perpendicular relation to the longitudinal axes of said cross ties to thereby lock said sections against relative folding movement.

2. A foldable litter as defined in claim 1, wherein said hinge means comprise pairs of hinges connecting the side rails of each of said sections to the side rails of another of said sections, and wherein the pairs of hinges are arranged alternately on opposite sides of the side rails of each successive section.

3. A litter comprising a foldable frame including a pair of relatively spaced apart, longitudinally extending side rails each composed of a plurality of separate, relatively adjoining, straight sections, a flexible patient-supporting means connected between said side rails; hinge means connecting the sections of said side rails to one another for movement between relatively folded and longitudinally extended positions, said hinge means having lineal hinge pin means whose axes are disposed in perpendicular relation to the longitudinal axes of said sections; a plurality of straight, rigid cross members extending transversely between and joining said side rails at longitudinally spaced intervals therealong, said cross members including opposite end portions pivotally, but nonslidably connected with said side rails and providing for turning movement of each of said side rails as a unit about an axis extending longitudinally thereof when the sections of said side rails occupy their relatively extended positions, and said hinge means being turnable with said side rails to positions in which the axes of their hinge pin means are disposed in perpendicular relation to both the longitudinal axes of said side rails and the longitudinal axes of said cross members to thereby lock the adjoining side rail sections against relative folding movement; and handle means at the opposed ends of each of said side rails whereby the litter may be carried.

4. A litter according to claim 3 including foldable legs connected to at least some of said side rail sections, said legs being foldable from an inoperative position closely adjacent the side rail sections to an operative position substantially perpendicular to said side rail sections, locking means for locking said legs in said operative position, said locking means being actuated by said turning of said side rail sections.

5. A litter according to claim 4 in which said locking means comprises channel formations carried by the respective side rail sections and extending transversely thereof, each of said legs comprising an outer main section pivoted to an inner lug section at a first pivot axis extending at a right angle to said first pivot axis and longitudinally of said rail section, the said second pivot axis corresponding to the said longitudinal axis about which the respective rail section is turnable, said main leg section being swingable about said first pivot axis relative to the lug section into and out of alignment therewith before turning of said rail section and when in alignment providing a joint therebetween, turning of said rail section about said longitudinal axis also serving to position the joint within said channel formation to prevent further pivoting about said first pivot axis.

6. A foldable litter comprising a plurality of relatively adjoining frame forming sections foldably connected, said sections comprising two end sections with at least one intermediate section therebetween, each of said end sections comprising a pair of relatively spaced apart, longitudinally extending side rails and a rigid cross tie extending transversely between said side rails, a patient-supporting flexible web anchored to said cross ties of the end sections and extending longitudinally in association with all of said sections, said intermediate section comprising a pair of relatively spaced apart longitudinally extending side rails, means pivotally connecting the side rails of the end sections to the cross ties thereof and providing for turning movement only of said side rails with respect to said cross ties about axes extending longitudinally of said side rails; and hinge means connecting the side rails of each of said sections to the side rails of another of said sections, said hinge means including lineal hinge pin means whose axes are disposed in perpendicular relation to the longitudinal axes of said side rails and said hinge means being turnable bodily with said side rails about the longitudinal axes of said side rails between a first position in which the axes of their hinge pin means are disposed in parallel relation to the longitudinal axes of said cross ties to permit said sections to be folded with respect to one another and a second position in which the axes of their hinge pin means are disposed in perpendicular relation to the longitudinal axes of said cross ties to thereby lock said sections against relative folding movement.

7. A foldable litter as defined in claim 6, wherein said hinge means comprise pairs of hinges connecting the side rails of each of said sections to the side rails of another of said sections, and wherein the pairs of hinges are arranged alternately on opposite sides of the side rails of each successive section.

8. A foldable litter according to claim 7 in which the means pivotally connecting the side rails and the cross ties comprises channel formations extending transversely of the side rails and between which the associated ends of the cross ties extend, each end of each tie being pivoted in a channel formation at a first pivot axis which provides one of the turning axes for the corresponding side rail extending longitudinally thereof, a leg connected to each end of each cross tie, said leg comprising a lug section fixed to the tie at a right angle thereto and a main section pivoted to the lug section about a second pivot axis extending at a right angle to the first pivot axis and transversely relative to said side rail, the main section of the leg being swingable about said second pivot axis with the associated side rail in said first turned position between a folded position and an extended position in alignment with the lug section to provide a joint therebetween, said channel formation moving into straddling relationship to said joint upon turning of said side rail to said second position.

9. A litter according to claim 8 including additional leg units connected to one or more of said sections longitudinally intermediate said cross ties, each of said additional leg units comprising opposed legs connected by a transverse brace and pivoted to opposed side rails, each of the opposed legs being pivoted to a channel formation disposed transversely of the respective side rail, each of said legs comprising an outer main section pivoted to an inner lug section at a first pivot axis extending transversely of the respective side rail, said lug section being pivoted within the respective channel formation at a second pivot axis extending at a right angle to said first axis and longitudinally of said side rail and corresponding to the axis about which said rail is turnable, said main leg section being swingable about said first pivot axis relative to the lug section into and out of alignment therewith to provide a joint therebetween when the side rail is in said first turned position, said channel formation moving into straddling relationship to said joint upon turning of said side rail to said second position.

References Cited by the Examiner
UNITED STATES PATENTS

| 2,203,193 | 6/1940 | Ettinger | 5—111 X |
| 2,407,085 | 9/1946 | Leather et al. | 5—82 |
| 2,708,276 | 5/1955 | Schloss et al. | 5—82 X |

FOREIGN PATENTS

| 432,690 | 7/1935 | Great Britain. |

FRANK B. SHERRY, *Primary Examiner.*

R. D. KRAUS, *Assistant Examiner.*